(12) United States Patent
Hodges

(10) Patent No.: US 9,743,652 B2
(45) Date of Patent: Aug. 29, 2017

(54) FISHING LINE KNOT TYING DEVICE

(71) Applicant: Sam E. Hodges, Leesburg, FL (US)

(72) Inventor: Sam E. Hodges, Leesburg, FL (US)

( * ) Notice: Subject to any disclaimer, the term of this patent is extended or adjusted under 35 U.S.C. 154(b) by 44 days.

(21) Appl. No.: 14/791,867

(22) Filed: Jul. 6, 2015

(65) Prior Publication Data

US 2017/0006844 A1    Jan. 12, 2017

(51) Int. Cl.
*A01K 91/04*    (2006.01)
*A01K 97/00*    (2006.01)

(52) U.S. Cl.
CPC .............. *A01K 91/04* (2013.01); *A01K 97/00* (2013.01)

(58) Field of Classification Search
CPC .................................. A01K 91/04; B24B 5/22
USPC ...................................... 289/1.5, 17
See application file for complete search history.

(56) References Cited

U.S. PATENT DOCUMENTS

| | | | | | |
|---|---|---|---|---|---|
| 2,460,672 | A | * | 2/1949 | Benedik ................. | D05B 87/04 223/101 |
| 2,641,078 | A | * | 6/1953 | Gearien ................. | A01K 97/14 24/131 R |
| 2,697,624 | A | * | 12/1954 | Thomas ................. | A01K 91/04 289/17 |
| 2,758,858 | A | * | 8/1956 | Smith, Sr. ............... | A01K 91/04 289/17 |
| 2,843,961 | A | * | 7/1958 | Semple ................. | A01K 91/04 289/17 |
| 2,926,036 | A | * | 2/1960 | Wimberley ............ | A01K 91/04 289/17 |
| 2,992,029 | A | * | 7/1961 | Russell ................. | A01K 91/04 289/17 |
| 3,019,546 | A | * | 2/1962 | Hansen ................. | A01K 91/04 43/44.91 |
| 3,073,636 | A | * | 1/1963 | Boutwell ............... | A01K 91/04 289/17 |
| 3,106,417 | A | * | 10/1963 | Clow ..................... | A01K 91/04 289/17 |
| 3,177,021 | A | * | 4/1965 | Benham ................. | A01K 91/04 289/17 |
| 3,265,422 | A | * | 8/1966 | Pierce .................... | A01K 91/04 289/17 |
| 3,326,586 | A | * | 6/1967 | Frost ..................... | A01K 91/04 289/17 |
| 3,401,967 | A | * | 9/1968 | Glowka ................. | A01K 91/04 289/17 |
| 3,402,957 | A | * | 9/1968 | Peterson ............... | A01K 91/04 289/17 |
| 3,476,423 | A | * | 11/1969 | Kentfield .............. | B65H 69/00 289/17 |

(Continued)

*Primary Examiner* — Shaun R Hurley
*Assistant Examiner* — Bao-Thieu L Nguyen
(74) *Attorney, Agent, or Firm* — Allen, Dyer, Doppelt + Gilchrist, P.A.

(57) ABSTRACT

A fishing line knot tying device includes a housing having a hollow upper portion and a contiguous lower portion. The upper portion includes a peripheral upper edge and a V-shaped notch formed therein. The lower portion includes a lower edge and a slot formed therein, an alignment of a gap of the slot being offset from a center of the V-shaped notch of the upper portion, a longitudinal groove formed in an outer surface of the slot, and a flat thumb surface being formed in an outer surface of the lower portion from an end of the gap of the slot and extending to an outer surface of the upper surface.

8 Claims, 1 Drawing Sheet

(56) References Cited

U.S. PATENT DOCUMENTS

| | | | | |
|---|---|---|---|---|
| 3,625,556 | A * | 12/1971 | Stromberg | A01K 91/04 289/17 |
| 3,630,555 | A * | 12/1971 | Newlin | D04G 1/00 289/17 |
| 3,700,272 | A * | 10/1972 | Bauer | A01K 91/04 289/17 |
| 3,752,516 | A * | 8/1973 | Mumma | A01K 91/04 289/17 |
| 3,837,691 | A * | 9/1974 | Smythe | A01K 91/04 289/17 |
| 3,905,145 | A * | 9/1975 | Cunningham | A01K 97/18 43/53.5 |
| 4,101,152 | A * | 7/1978 | Gardipee | A01K 91/04 289/17 |
| 4,188,052 | A * | 2/1980 | Browning | D04G 5/00 289/17 |
| 4,315,445 | A * | 2/1982 | Catron | A01K 91/04 43/1 |
| 4,403,797 | A * | 9/1983 | Ragland, Jr. | A01K 91/04 289/17 |
| 4,864,762 | A * | 9/1989 | Cox | A01K 91/04 289/17 |
| 5,098,137 | A * | 3/1992 | Wardall | A01K 91/04 289/17 |
| 5,314,217 | A * | 5/1994 | Place | A63H 27/10 289/17 |
| 5,501,690 | A * | 3/1996 | Measamer | A61B 17/0469 606/144 |
| 5,568,950 | A * | 10/1996 | Herren | A63H 27/10 289/17 |
| 5,584,835 | A * | 12/1996 | Greenfield | A61B 17/0401 606/232 |
| 5,593,189 | A * | 1/1997 | Little | A01K 91/04 289/17 |
| 5,716,368 | A * | 2/1998 | de la Torre | A61B 17/0469 112/169 |
| 5,948,001 | A * | 9/1999 | Larsen | A61B 17/0469 606/104 |
| 5,971,447 | A * | 10/1999 | Steck, III | A01K 91/04 289/17 |
| 6,325,426 | B1 * | 12/2001 | Boesl | A63H 27/10 289/1.5 |
| 6,625,921 | B2 * | 9/2003 | Friederichs, III | A01K 91/04 43/4 |
| 6,634,680 | B1 * | 10/2003 | Firestone | A01K 91/04 289/17 |
| 6,817,634 | B2 * | 11/2004 | Champion | A01K 91/04 289/1.5 |
| 7,261,327 | B1 * | 8/2007 | Johnston | A01K 91/04 289/17 |
| 7,997,629 | B2 * | 8/2011 | High | A01K 91/047 289/17 |
| 8,146,286 | B2 * | 4/2012 | Wood | A01K 91/04 289/17 |
| 8,511,721 | B1 * | 8/2013 | Farner | A01K 91/04 289/17 |
| 8,511,722 | B1 * | 8/2013 | Farner | A01K 91/04 289/17 |
| 8,668,705 | B2 * | 3/2014 | Johnston | A61B 17/0401 606/151 |
| 8,747,470 | B2 * | 6/2014 | Beck, Jr. | A61F 2/0811 623/13.12 |
| 8,758,367 | B2 * | 6/2014 | Philippon | A61B 17/0401 606/139 |
| 8,936,282 | B1 * | 1/2015 | Berdahl | B65H 69/04 289/17 |
| 8,998,949 | B2 * | 4/2015 | Stone | A61B 17/0401 604/500 |
| 9,015,986 | B2 * | 4/2015 | Bennis | A01K 93/00 43/44.91 |
| 9,265,602 | B2 * | 2/2016 | Beck, Jr. | A61F 2/0811 |
| 2015/0048616 | A1 * | 2/2015 | Mashhour | A01K 91/04 289/1.5 |

* cited by examiner

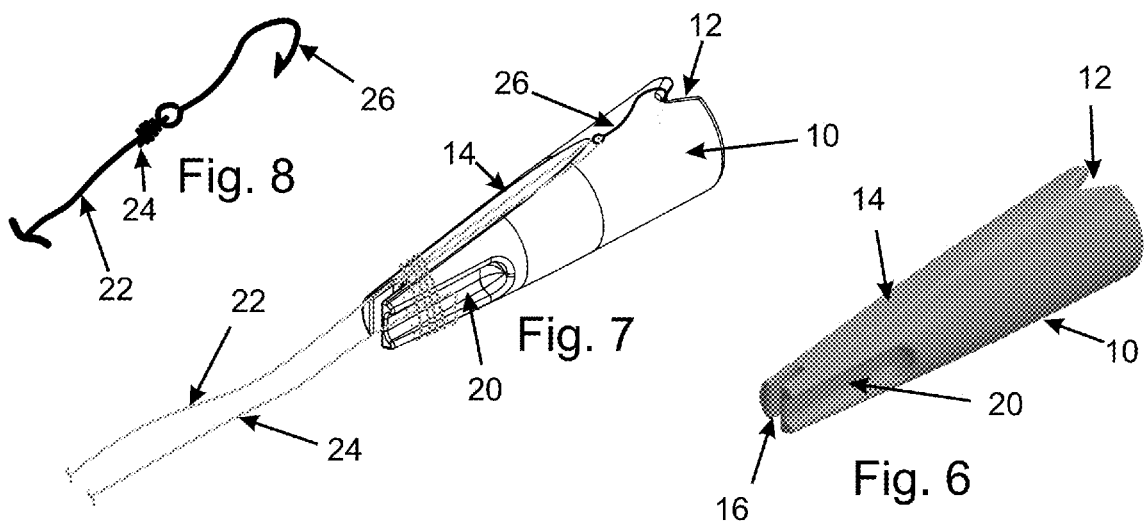
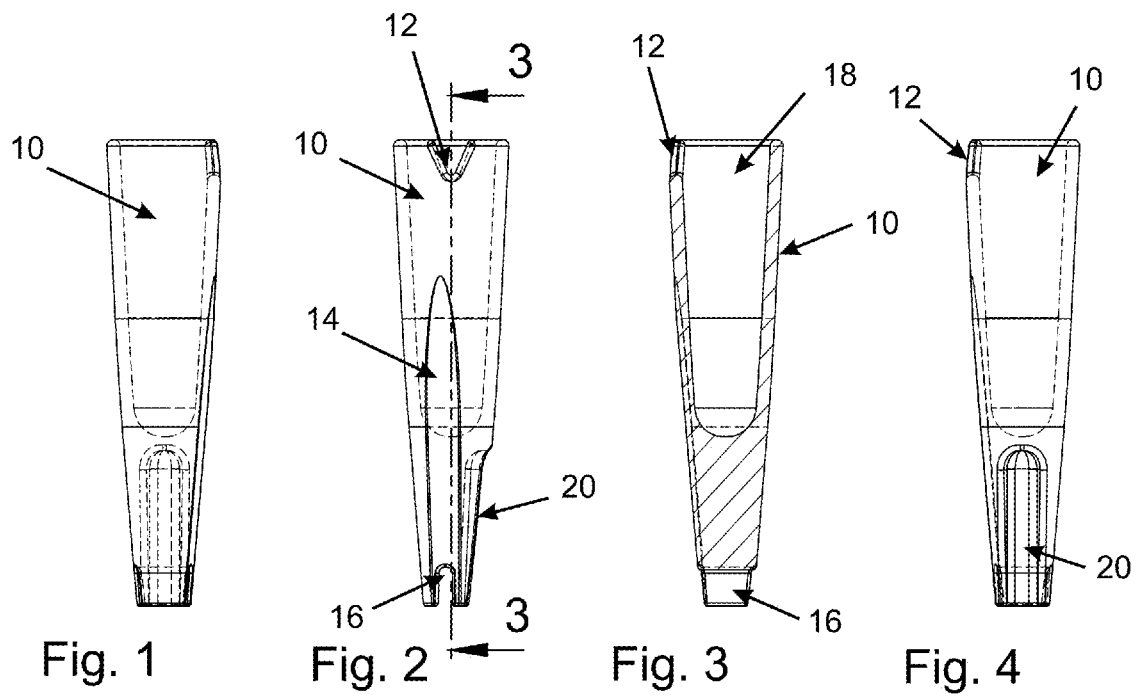
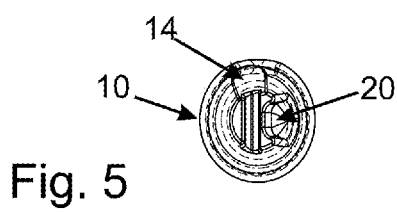

FISHING LINE KNOT TYING DEVICE

FIELD OF THE INVENTION

The present invention relates to fishing line rigging and, more particularly, to making quality fishing knot tying easy.

BACKGROUND OF THE INVENTION

Fishing has been enjoyed by many as a relaxing pastime and also for many as a business opportunity. There are many different kinds of fishing along with many different types of fishing equipment such as rods, reels, lures, lines etc. One common need with most types of fishing is the ability to tie a quick and easy but strong fishing knot. Also one needs to be able to tie multiple types of knots to meet the requirement of the specific application. To do this one needs a tool that can accommodate all types and sizes of fishing line. This tool needs to be light weight and small enough to fit easily in any pocket and also fit comfort in the palm of one's hand. This tool needs to be simple to operate, light weight and inexpensive. All of the above advantages and more are taught by this invention Other more specific objectives and advantages of the invention will be apparent from the consideration of the following specification and accompanying drawings, wherein:

Consequently, other known knot tying tools have been devised to ease related problems.

Initially, fishing knots were hand tied. Consequently inventors have developed many different designed tools to help one tie fisherman knots. Such tools can be found in on line stores, bait stores and many other sportsman headquarter type outlet stores and are described, for example, in U.S. Pat. Nos. 5,971,447, 4,403,797, 3,837,691, 3,106,417 and 2,926,056.

Prior art knot tying tools come in all shapes and sizes. Some tools are complicated to use, some tools are more bulky, some tools have line size restrictions, some tools are limited to what knot types they will tie, some tools are more prone to hook stabbings experienced by a user, some tools are more expensive to manufacture and some are awkward to hold and use.

None are known, however, to provide in one package an easy to use, durable design, light weight design, compact size, ergonomic shape, ability to handle light weight fishing line to heavy weight leader lines, ability to tie various knot types for different fishing applications, provide safe and secure protected hook placement, and are sleek and inexpensive to manufacture as taught by this invention.

It would be advantageous to provide a fishing line knot maker that facilitates tying the fisherman nail knot.

It would also be advantageous to provide a fishing line knot maker that facilitates tying the fisherman shank knot.

It would also be advantageous to provide a fishing line knot maker that facilitates splicing two lines together.

It would also be advantageous to provide a fishing line knot maker that facilitates tying a leader line to the end of a fly rod fishing line.

It would also be advantageous to provide a fishing line knot maker that is easy to operate.

It would also be advantageous to provide a fishing line knot maker that is durable.

It would also be advantageous to provide a fishing line knot maker that is lightweight.

It would also be advantageous to provide a fishing line knot maker that is sleek and compact.

It would also be advantageous to provide a fishing line knot maker that ergonomically shaped.

It would also be advantageous to provide a fishing line knot maker that works with light weight fishing line to heavy weight leader line.

It would also be advantageous to provide a fishing line knot maker that provides safe hook placement while knot tying that keeps sharp end away from fisherman.

It would also be advantageous to provide a fishing line knot maker that is inexpensive to manufacture.

SUMMARY OF THE INVENTION

In accordance with the present invention, there is provided a fishing line knot maker that is functional, easy to use, compact, light-weight, inexpensive to manufacture and durable. The device is a one piece construction that fits easily and comfortably in ones palm or any pocket. The device ties multiple types of knots and eliminates the need for additional knot making tools. The device is also capable of making knots from lightweight fishing line to heavy weight leader line.

BRIEF DESCRIPTION OF THE DRAWINGS

A complete understanding of the present invention may be obtained by reference to the accompanying drawing, when considered in conjunction with the subsequent, detailed description, in which:

FIG. 1 is a front elevational view of a particular embodiment of a fishing knot maker tool;

FIG. 2 is a right elevational view of the fishing knot maker tool;

FIG. 3 is a cross sectional view of the fishing knot maker tool;

FIG. 4 is a rear elevational view of the fishing knot maker tool;

FIG. 5 is a top plan view of the fishing knot maker tool;

FIG. 6 is a perspective view of the fishing knot maker tool;

FIG. 7 is a perspective view of the fishing knot maker tool with fishing line tying a fisherman's nail knot; and FIG. 8 is a perspective view of the completed fisherman's nail knot.

For purposes of clarity and brevity, like elements and components will bear the same designations and numbering throughout the Figures.

DESCRIPTION OF THE PREFERRED EMBODIMENT

FIG. 1 is a front elevational view of the fishing knot maker tool in accordance with the invention. The tapered body 10 is cone shaped to comfortably fit in either hand and also this shape aids during knot tying and is rigid and light weight. The one piece construction makes it ideal for plastic injection molding but one could also use metal, wood or other suitable material. All features that make up this tool (hook groove 12, thumb plate 14, nose fork 16, body hollow 18, line groove 20) are incorporated in this one piece design.

FIG. 2 shows a right elevational view of the fishing knot maker tool in accordance with the invention. The tapered body 10 is cone shaped to comfortably fit in either hand and also this shape aids during knot tying and is rigid and light weight. The hook groove 12 is a feature of the tapered body 10 and is positioned to line up and secure hook or lure properly during knot tying. The thumb plate 14 is a feature of the tapered body 10 and is positioned to enable the thumb to hold the fishing line 22 or fishing hook 26 in place when tying a knot. The nose fork 16 is a feature of the tapered body 10 and is positioned to line up the fishing line 22 and also it enables one to wrap the tag line around the tapered body 10 when tying a knot. The line groove 20 is a feature of the tapered body 10 and is positioned to feed the fishing tag line under the coiled line to complete the knot tying. Once the fishing tag line is fed under the coiled line, one pulls the fishing line 22 and the fishing line tag 24 which pulls the coiled line off the tapered body 10 and completes the knot tying. Also the line groove 20 is used when tying a leader line to a fly line.

FIG. 3 is a cross sectional view of the fishing knot maker tool. The tapered body 10 is cone shaped to comfortably fit in either hand and also this shape aids during knot tying and is rigid and light weight. The hook groove 12 is a feature of the tapered body 10 and is positioned to line up and secure hook or lure properly during knot tying. The nose fork 16 is a feature of the tapered body 10 and is positioned to line up fishing line 22 and also it enables one to wrap the tag line around the tapered body 10 during knot tying. The body hollow 18 allows space for a hook tip to return inside the tapered body 10 to aid in knot tying and also protect the user from the point of the hook. The body hollow 18 also removes excess weight from the knot maker tool.

FIG. 4 is a rear elevational view of the fishing knot maker tool. The tapered body 10 is cone shaped to comfortably fit in either hand and also this shape aids during knot tying and is rigid and light weight. The hook groove 12 is a feature of the tapered body 10 and is positioned to line up and secure the hook or lure properly during knot tying. The line groove 20 is a feature of the tapered body 10 and is positioned to feed the fishing tag line under the coiled line to complete the knot tying. Once the fishing tag line is fed under the coiled line, one pulls the fishing line 22 and the fishing line tag 24 which pulls the coiled line off the tapered body 10 and completes the knot tying. Also the line groove 20 is used when tying a leader line to a fly line.

FIG. 5 is a top plan view of the fishing knot maker tool. The tapered body 10 is cone shaped to comfortably fit in either hand and also this shape aids during knot tying and is rigid and light weight. The thumb plate 14 is a feature of the tapered body 10 and is positioned to enable the thumb to hold the fishing line 22 or fishing hook 26 in place when tying a knot. The line groove 20 is a feature of the tapered body 10 and is positioned to feed the fishing tag line under the coiled line to complete the knot tying. Once the fishing tag line is fed under the coiled line, one pulls the fishing line 22 and the fishing line tag 24 which pulls the coiled line off the tapered body 10 and completes the knot tying. Also the line groove 20 is used when tying a leader line to a fly line.

FIG. 6 is a perspective view of the fishing knot maker. The tapered body 10 is cone shaped to comfortably fit in either hand and also this shape aids during knot tying and is rigid and light weight. The hook groove 12 is a feature of the tapered body 10 and is positioned to line up and secure the hook or lure properly during knot tying. The thumb plate is a feature of the tapered body 10 and is positioned to enable the thumb to hold the fishing line 22 or fishing hook 26 in place when tying a knot. The nose fork 16 is a feature of the tapered body 10 and is positioned to line up the fishing line 22 and also it enables one to wrap the tag line around the tapered body 10 when tying a knot. The line groove 20 is a feature of the tapered body 10 and is positioned to feed the fishing tag line under the coiled line to complete the knot tying. Once the fishing tag line is fed under the coiled line, one pulls the fishing line 22 and the fishing line tag 24 which pulls the coiled line off the tapered body 10 and completes the knot tying. Also the line groove 20 is used when tying a leader line to a fly line.

FIG. 7 is a perspective view of the fishing knot maker tool with fishing line 22 tying a fisherman's nail knot. The tapered body 10 is cone shaped to comfortably fit in either hand and also this shape aids during knot tying and is rigid and light weight. The hook groove 12 is a feature of the tapered body 10 and is positioned to line up and secure the hook or lure properly during knot tying. The thumb plate 14 is a feature of the tapered body 10 and is positioned to enable the thumb to hold the fishing line 22 or fishing hook 26 in place when tying a knot. The nose fork 16 is a feature of the tapered body 10 and is positioned to line up the fishing line 22 and also it enables one to wrap the tag line around the tapered body 10 when tying a knot. The line groove 20 is a feature of the tapered body 10 and is positioned to feed the fishing tag line under the coiled line to complete the knot tying. Once the fishing tag line is fed under the coiled line, one pulls the fishing line 22 and the fishing line tag 24 which pulls the coiled line off the tapered body 10 and completes the knot tying. Also the line groove 20 is used when tying a leader line to a fly line. In use, the fishing hook 26 is secured in the hook groove 12. The fishing line 22 is threaded through the fishing hook 26 and the fishing line 22 end is pulled straight across the thumb plate 14 and down through the nose fork 16 and out the end. The fishing line tag 24 end is pulled straight across the thumb plate 14 then 90 degrees down the nose fork 16 then coiled four times around the tapered body 10 then fed under the coils through the line groove 20 and out the front beside the fishing line 22. The user grips both the fishing line 22 and fishing line tag 24 and pulls forward which will pull the coils off the tapered body 10 and snug up to complete the fisherman nail knot.

FIG. 8 is a perspective view of a completed fisherman's nail knot. The completed fisherman knot includes the fishing line 22 and trimmed fishing line tag 24, tied to the fishing hook 26.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A fishing line knot tying device comprising:
   a housing having a hollow upper portion and a contiguous lower portion, an outer diameter of the housing continuously decreasing from the upper portion to the lower portion along a longitudinal central axis of the housing;
   the upper portion having a peripheral upper edge and a V-shaped notch formed therein; and
   the lower portion having a lower edge and a slot formed therein, an alignment of a gap of the slot being offset from a center of the V-shaped notch of the upper portion, a longitudinal groove formed in an outer surface of the slot and extending from the lower edge of the lower portion to the upper portion, and a flat thumb surface being formed in an outer surface of the lower portion from each end of the gap of the slot and extending to the upper portion.

2. The fishing line knot tying device of claim 1, wherein the longitudinal groove is configured for an end of a fishing line to slide under the fishing line wrapped around the lower portion when tying a knot.

3. The fishing line knot tying device of claim 1, wherein the outer surface of the lower portion is smooth and configured for a fishing line to slip off once a knot is tied.

4. The fishing line knot tying device of claim 1, wherein the gap of the slot extends completely across a diameter of the lower portion.

5. The fishing line knot tying device of claim 1, wherein the housing has a frustoconical shape.

6. The fishing line knot tying device of claim 1, wherein the housing comprises at least one of plastic, metal, and wood.

7. The fishing line knot tying device of claim 1, wherein the hollow upper portion is configured for a tip of a hook to return inside as a bend of the hook is secured within the V-shaped notch.

8. The fishing line knot tying device of claim 1, wherein the flat thumb surface is configured for a thumb of a user to hold a fishing line or fishing hook in place when tying a knot.

\* \* \* \* \*